United States Patent
Lynn et al.

(10) Patent No.: US 10,351,190 B2
(45) Date of Patent: Jul. 16, 2019

(54) THREE-WHEELED VEHICLE HAVING NON-AXIAL DRIVE

(71) Applicant: Piaggio Fast Forward, Inc., Boston, MA (US)

(72) Inventors: Gregory Stewart Lynn, Venice, CA (US); Jeffrey T. Schnapp, Cambridge, MA (US); Amos Ambler, Christiana, PA (US); Jarrod Smith, Monson, MA (US); Nazareth V. Ekmekjian, Cambridge, MA (US); Emanuele Savino, Pontadera (IT)

(73) Assignee: PIAGGIO FAST FORWARD, INC., Boston, MA (US)

( * ) Notice: Subject to any disclaimer, the term of this patent is extended or adjusted under 35 U.S.C. 154(b) by 35 days.

(21) Appl. No.: 15/591,760

(22) Filed: May 10, 2017

(65) Prior Publication Data

US 2018/0208258 A1     Jul. 26, 2018

(30) Foreign Application Priority Data

Jan. 25, 2017    (IT) .......................... 102017000007710

(51) Int. Cl.
     *B60K 1/02*          (2006.01)
     *B60K 7/00*          (2006.01)
     (Continued)

(52) U.S. Cl.
     CPC ................ *B62D 61/08* (2013.01); *B60K 1/02* (2013.01); *B60K 7/00* (2013.01); *B60K 7/0007* (2013.01);
     (Continued)

(58) Field of Classification Search
     CPC ...... B62D 61/06; B62D 61/065; B62D 61/08; B62D 5/04; B62B 5/004; B62B 5/0043;
     (Continued)

(56) References Cited

U.S. PATENT DOCUMENTS

| 1,819,924 A | * | 8/1931 | Seppola | ............... | B60K 17/043 |
| | | | | | 180/10 |
| 3,123,173 A | * | 3/1964 | Jacobs | ..................... | B60K 1/00 |
| | | | | | 180/19.2 |

(Continued)

FOREIGN PATENT DOCUMENTS

| EP | 0705724 | | 4/1996 |
| JP | 06134049 A | * | 5/1994 |

(Continued)

OTHER PUBLICATIONS

International Search Report and Written Opinion dated Oct. 24, 2017, issued in the corresponding International Search Report and Written Opinion application No. PCT/US2017/031944.

*Primary Examiner* — Laura Freedman
(74) *Attorney, Agent, or Firm* — Onello & Mello, LLP

(57) ABSTRACT

A three-wheeled vehicle includes a chassis, a first wheel rotatably connected to the chassis, the first wheel having a first perimeter, a first diameter and a first geometric center, a second wheel rotatably connected to the chassis, the second wheel having a second perimeter, a second diameter and a second geometric center, a first motor and a second motor, a first drive and a second drive gear, a first plurality of teeth disposed about the first wheel and mechanically engaged with the first drive gear at a location closer to the first perimeter than to the first geometric center, a second plurality of teeth disposed about the second wheel and mechanically engaged with the second drive gear at a location closer to the second perimeter than to the second geometric center, a mount rotatably connected to the chassis and a third wheel rotatably connected to the mount.

22 Claims, 12 Drawing Sheets

(51) Int. Cl.

| | | |
|---|---|---|
| *B60L 7/10* | (2006.01) | |
| *B62D 5/04* | (2006.01) | |
| *B62K 5/02* | (2013.01) | |
| *B60K 17/04* | (2006.01) | |
| *B60K 17/24* | (2006.01) | |
| *B60L 50/50* | (2019.01) | |
| *B60T 13/58* | (2006.01) | |
| *B62D 61/06* | (2006.01) | |
| *B62D 61/08* | (2006.01) | |
| *B62K 5/027* | (2013.01) | |

(52) U.S. Cl.
CPC ............ *B60K 17/043* (2013.01); *B60K 17/24* (2013.01); *B60L 7/10* (2013.01); *B60L 50/50* (2019.02); *B60T 13/586* (2013.01); *B62D 5/04* (2013.01); *B62D 61/06* (2013.01); *B62K 5/02* (2013.01); *B62K 5/027* (2013.01); *B60K 2007/0038* (2013.01); *B60K 2007/0061* (2013.01)

(58) Field of Classification Search
CPC . B62K 5/02; B62K 5/027; B60K 1/02; B60K 7/00; B60K 7/0007; B60K 17/043; B60K 17/046; B60K 17/24; B60K 2007/0038; B60K 2007/0061; B60L 7/10; B60L 50/50; B60T 13/586
See application file for complete search history.

(56) References Cited

U.S. PATENT DOCUMENTS

| | | | | |
|---|---|---|---|---|
| 3,776,353 A * | 12/1973 | Roth | ................ | B62D 61/08 180/215 |
| 3,858,673 A * | 1/1975 | Browning | ............. | B62D 57/00 180/211 |
| 3,921,740 A * | 11/1975 | Forster | ................. | A61G 3/061 180/213 |
| 4,179,006 A * | 12/1979 | Lenack | ................ | B60K 17/043 180/10 |
| 4,222,452 A * | 9/1980 | Fachini | ................. | B62D 5/093 180/210 |
| 4,714,140 A * | 12/1987 | Hatton | ................. | B62D 61/08 180/167 |
| 4,986,387 A * | 1/1991 | Thompson | ............. | B62D 7/142 180/212 |
| 5,248,011 A * | 9/1993 | Richards | ................. | B60G 3/01 180/215 |
| 5,343,974 A | 9/1994 | Rabek | | |
| 5,558,174 A | 9/1996 | Avitan et al. | | |
| 6,328,125 B1 * | 12/2001 | Van Den Brink | ............ | B60G 17/0162 180/211 |
| 6,880,654 B2 * | 4/2005 | Plishner | ............ | B60G 17/0157 180/65.6 |
| 6,974,399 B2 * | 12/2005 | Lo | ............ | B62M 7/12 180/65.51 |
| 7,124,854 B2 * | 10/2006 | Huang | ................. | B60K 17/043 180/371 |
| 7,938,210 B2 * | 5/2011 | Kunzler | ................... | B60G 3/01 180/65.51 |
| 7,997,361 B1 * | 8/2011 | Bell | ........................ | B62K 5/01 180/11 |
| 8,002,060 B2 * | 8/2011 | Komatsu | ............... | B60K 7/0007 180/65.51 |
| 8,096,378 B2 * | 1/2012 | Xie | ...................... | B60K 7/0007 180/65.51 |
| 8,186,467 B2 * | 5/2012 | Yoshino | ............... | B60K 7/0007 180/65.51 |
| 8,807,254 B2 * | 8/2014 | Manus | ................. | B60K 7/0007 180/65.51 |
| 8,932,170 B2 * | 1/2015 | Ishizuka | ............. | F16H 57/0471 475/159 |
| 8,985,264 B2 * | 3/2015 | Shirley | ................. | B60K 17/303 180/371 |
| 9,364,766 B2 * | 6/2016 | Mielniczek | .......... | A63H 27/12 |
| 9,630,447 B2 * | 4/2017 | Yoshino | ................. | B60B 19/003 |
| 9,764,592 B1 * | 9/2017 | Hays | ....................... | B60B 19/00 |
| 9,789,017 B2 * | 10/2017 | Hays | ................... | A61G 5/1054 |
| 2008/0245593 A1 | 10/2008 | Kim | | |
| 2011/0303035 A1 * | 12/2011 | Niebergall | ........... | B60K 17/043 74/414 |
| 2014/0011625 A1 * | 1/2014 | Thompson | .......... | B60K 17/043 475/225 |
| 2014/0116799 A1 * | 5/2014 | Pettigrew | ................ | A61G 5/04 180/446 |
| 2016/0068056 A1 * | 3/2016 | Burtov | ................. | B62M 6/60 180/65.51 |
| 2018/0105033 A1 * | 4/2018 | Schnapp | ............... | B60K 7/0007 |
| 2018/0105215 A1 * | 4/2018 | Schnapp | ............... | G05D 1/0891 |

FOREIGN PATENT DOCUMENTS

| | | |
|---|---|---|
| WO | 03065963 | 8/2003 |
| WO | 2008067822 | 6/2008 |

\* cited by examiner description relates generally to vehicles, and
THREE-WHEELED VEHICLE HAVING NON-AXIAL DRIVE

RELATED APPLICATIONS

The present application claims priority to, and the benefit of, Italian Patent Application No. 102017000007710, filed Jan. 25, 2017, and titled "THREE-WHEELED VEHICLE HAVING NON-AXIAL DRIVE".

TECHNICAL FIELD

The present description relates generally to vehicles, and more particularly, but not exclusively, to autonomous or semi-autonomous vehicles.

BACKGROUND

Vehicles often include various numbers, sizes and configurations of wheels used for converting a propulsive force into vehicle motion. Such wheels are generally rotatably attached, directly or indirectly, to the vehicle. The wheels rotate about a rotational axis and a connection between the wheel and vehicle, or a drive path between a propulsion source and the wheel, is generally located co-axially with the rotational axis. However, such an attachment and drive arrangement between existing vehicles and wheels may limit vehicle design or vehicle performance characteristics.

SUMMARY

According to some aspects of the subject technology, a three-wheeled vehicle is provided and includes a chassis having a height, a length and a width. The chassis further includes a first end and a second end. A first wheel is rotatably connected to the chassis at the first end. The first wheel has a first perimeter, a first diameter and a first geometric center. A second wheel is also rotatably connected to the chassis at the first end. The second wheel has a second perimeter, a second diameter and a second geometric center. A first motor provides a first drive energy to the first wheel via a first drivetrain and a second motor provides a second drive energy to the second wheel via a second drivetrain. A first drive gear is connected with the first drivetrain such that the first drive gear rotates with a rotation of the first drivetrain and a second drive gear is connected with the second drivetrain such that the second drive gear rotates with a rotation of the second drivetrain. A first plurality of teeth are disposed about the first wheel and mechanically engaged with the first drive gear at a location closer to the first perimeter than to the first geometric center. A second plurality of teeth are disposed about the second wheel and mechanically engaged with the second drive gear at a location closer to the second perimeter than to the second geometric center. A mount is rotatably connected to the chassis at the second end and a third wheel is rotatably connected to the mount.

According to some aspects of the subject technology, a three-wheeled vehicle includes a chassis having a height, a length and a width. The chassis further includes a first end and a second end and a first wheel is rotatably connected to the chassis at the first end. The first wheel has a first perimeter, a first diameter and a first geometric center. A second wheel is rotatably connected to the chassis at the first end, and the second wheel has a second perimeter, a second diameter and a second geometric center. First drive means provide a first drive energy to the first wheel and second drive means provide a second drive energy to the second wheel. First coupling means provide the first drive energy to the first wheel, and said first coupling means mechanically engage with the first wheel at a location closer to the first perimeter than to the first geometric center. Second coupling means provide the second drive energy to the second wheel, said second coupling means mechanically engage with the second wheel at a location closer to the second perimeter than to the second geometric center. A mount rotatably connects to the chassis at the second end and a third wheel is rotatably connected to the mount.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

The following figures are included to illustrate certain aspects of the present disclosure, and should not be viewed as exclusive implementations. The subject matter disclosed is capable of considerable modifications, alterations, combinations and equivalents in form and function, without departing from the scope of this disclosure.

DETAILED DESCRIPTION

Figure 1:
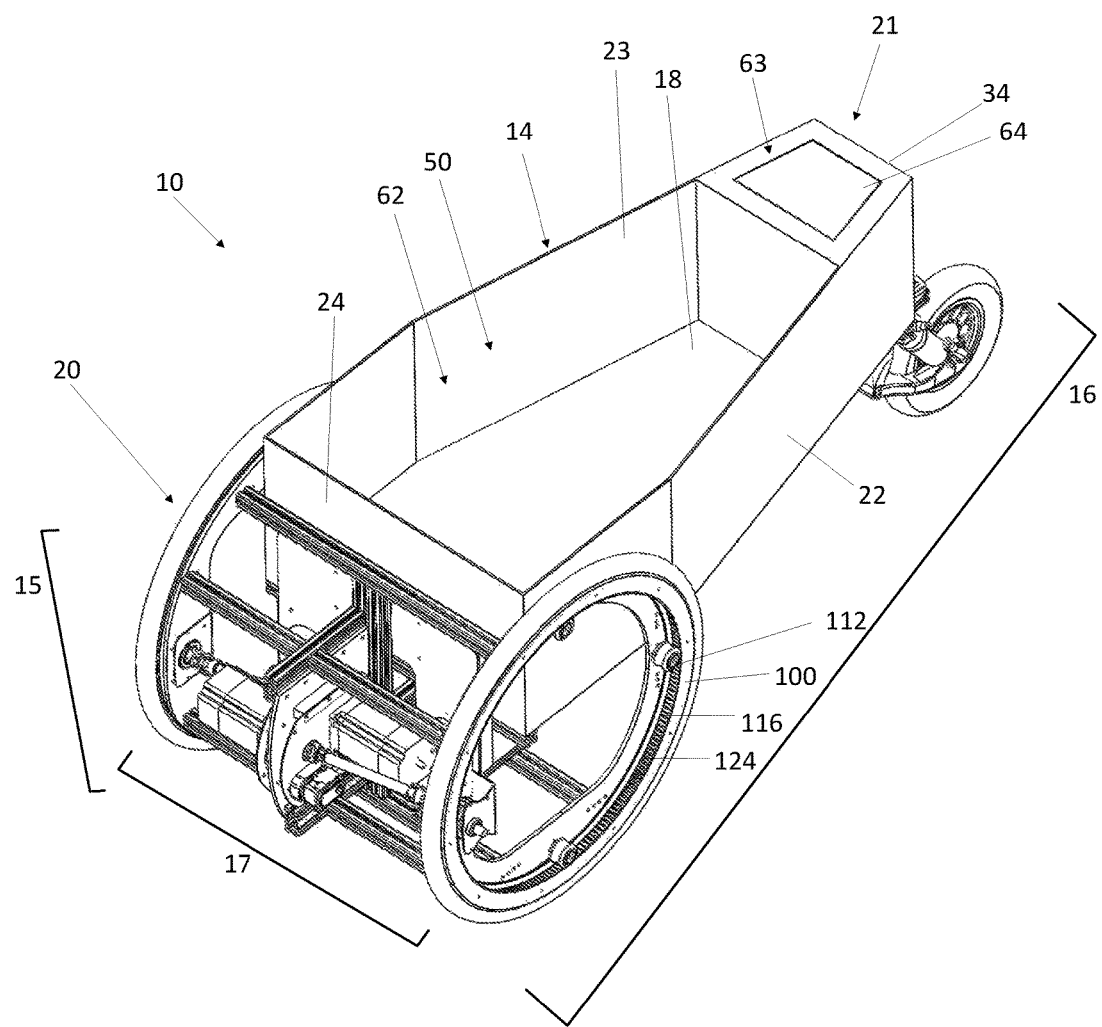
FIG. 1 is an upper perspective view of a vehicle according to exemplary implementations of the present disclosure.

While this disclosure is susceptible of implementations in many different forms, there is shown in the drawings and will herein be described in detail implementations of the disclosure with the understanding that the present disclosure is to be considered as an exemplification of the principles of the disclosure and is not intended to limit the broad aspects of the disclosure to the implementations illustrated.

Disclosed herein are exemplary implementations of a vehicle, and elements thereof. As shown in FIG. 1, the present disclosure provides a vehicle 10 including a chassis 14. The vehicle 10 defines a height 15, a length 16 and a width 17. In some implementations, the chassis 14 includes a floor 18, a first sidewall 22 and a second sidewall 23. The chassis 14 also includes a first end wall 24 and a second end wall 34. A cargo cavity 50 is disposed in, or on, the chassis 14, and may be wholly or partially formed by one or more of the floor 18, first sidewall 22, second sidewall 23, first end wall 24 and second end wall 34. The floor 18 and the first sidewall 22, second sidewall 23, first end wall 24 and second end wall 34 may be joined at a substantially right angle, although other arrangements are within the scope of this disclosure. For example, the floor 18 and the first sidewall 22, second sidewall 23, first end wall 24 and second end wall 34 may be joined with curved joints, acute angles or obtuse angles. The vehicle 10 also includes a first end 20 and a second end 21.

The cargo cavity 50, in some implementations, includes a first cargo compartment 62 and a second cargo compartment 63. The second cargo compartment 63 is, in certain implementations, sealable with a removable lid 64. In some implementations, the removable lid 64 is lockable relative to the second cargo compartment 63. Further, in some implementations, the vehicle 10 weight is between 50 and 150 pounds, inclusive.

Figure 2:
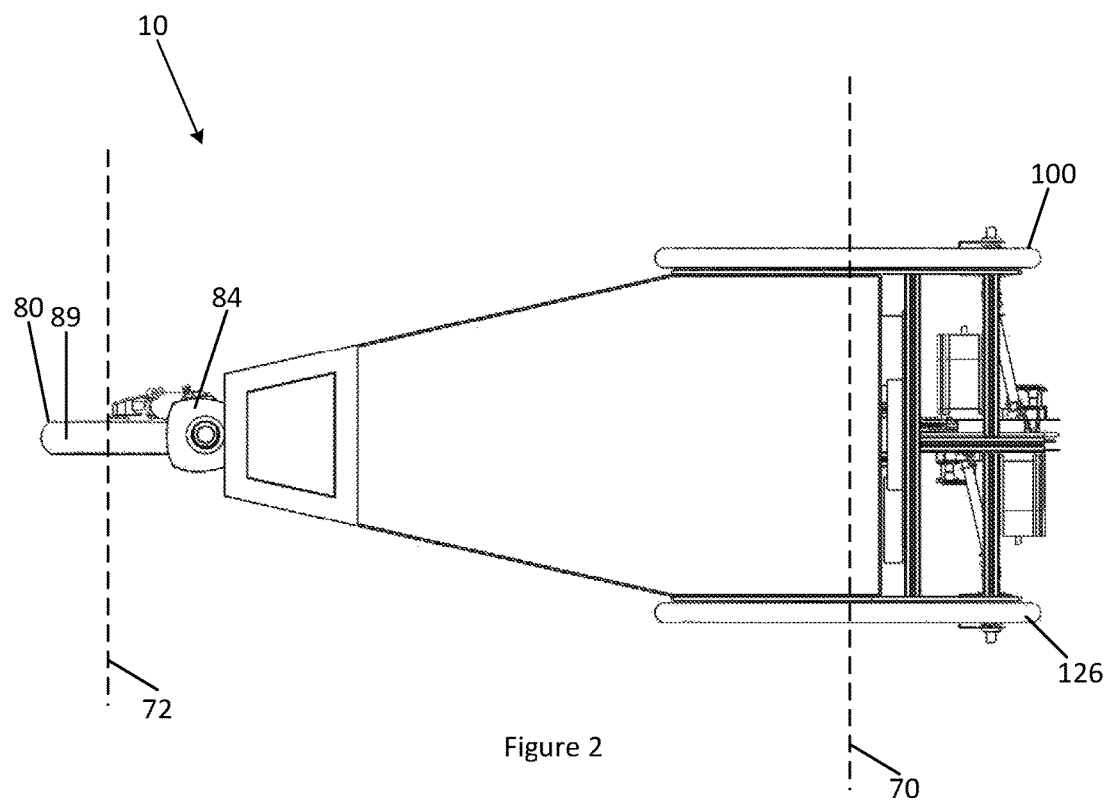
FIG. 2 is a top view of a vehicle according to exemplary implementations of the present disclosure.

As shown in FIG. 2, the vehicle 10 includes a first wheel 100 and a second wheel 126 disposed on either side of the vehicle 10. A wheel axis 70 extends generally between the first wheel 100 and the second wheel 126, and the wheel axis 70 is generally co-axial with a rotational axis of both of the first wheel 100 and the second wheel 126. Further, as described below, the wheel axis 70 generally extends between geometric centers of the first wheel 100 and the second wheel 126. Additionally, various fairings (not shown) can be added to the vehicle 10 to provide additional user interface features, ornamental design features and performance characteristics. A third wheel axis 72, about which a third wheel 80 rotates and described below in further detail, is also visible in FIG. 2.

Figure 3:
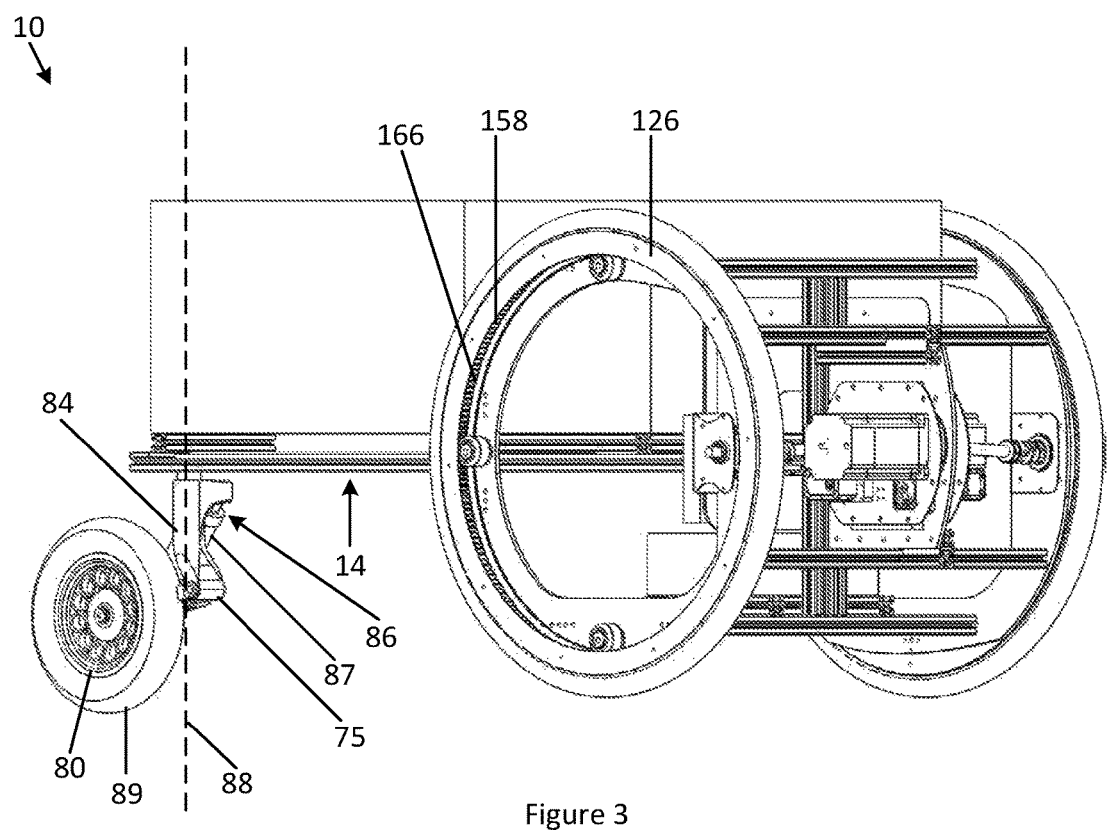
FIG. 3 is a right side perspective view of a vehicle according to exemplary implementations of the present disclosure.

FIG. 3 illustrates a right perspective view of the vehicle 10. As shown in FIG. 3, the third wheel 80 is rotationally supported by a third wheel mount 84, and the third wheel mount 84 is rotationally connected to the chassis 14. The third wheel mount 84 rotates about a mount axis 88. In some implementations, the third wheel mount 84 is able to rotate 360 degrees about the mount axis 88, relative to the chassis 14. In some implementations, the mount axis 88 is substantially perpendicular to the wheel axis 70. Further, in some implementations, the mount axis 88 is substantially perpendicular to the third wheel axis 72.

A mount motor 75 may rotate the third wheel mount 84 relative to the chassis 14 about the mount axis 88. The mount motor 75 may be an electric motor and may be disposed on, or in, the third wheel mount 84 and/or the chassis 14. In some implementations, the vehicle 10 does not include a mount motor 75 and the third wheel mount 84 passively rotates with respect to the vehicle 10 and/or chassis 14.

As also shown in FIG. 3, a third wheel suspension system 86 partially or entirely suspends the third wheel 80 relative to the chassis 14. The third wheel 80 is thus operatively associated with the chassis 14 via the third wheel suspension system 86. A third wheel suspension element 87 provides damping and/or suspension properties for the third wheel 80 relative to the chassis 14. The third wheel suspension element 87 includes, in some implementations, springs, pneumatic chambers or electromagnetic dampers. Further, in some implementations, the third wheel suspension element 87 is adjustable to provide varying degrees of suspending and/or damping properties between the third wheel 80 and the chassis 14. A third wheel tire 89 is also disposed around the third wheel 80. In some implementations, the third wheel 80 is between two and twenty inches in diameter.

Figure 4:
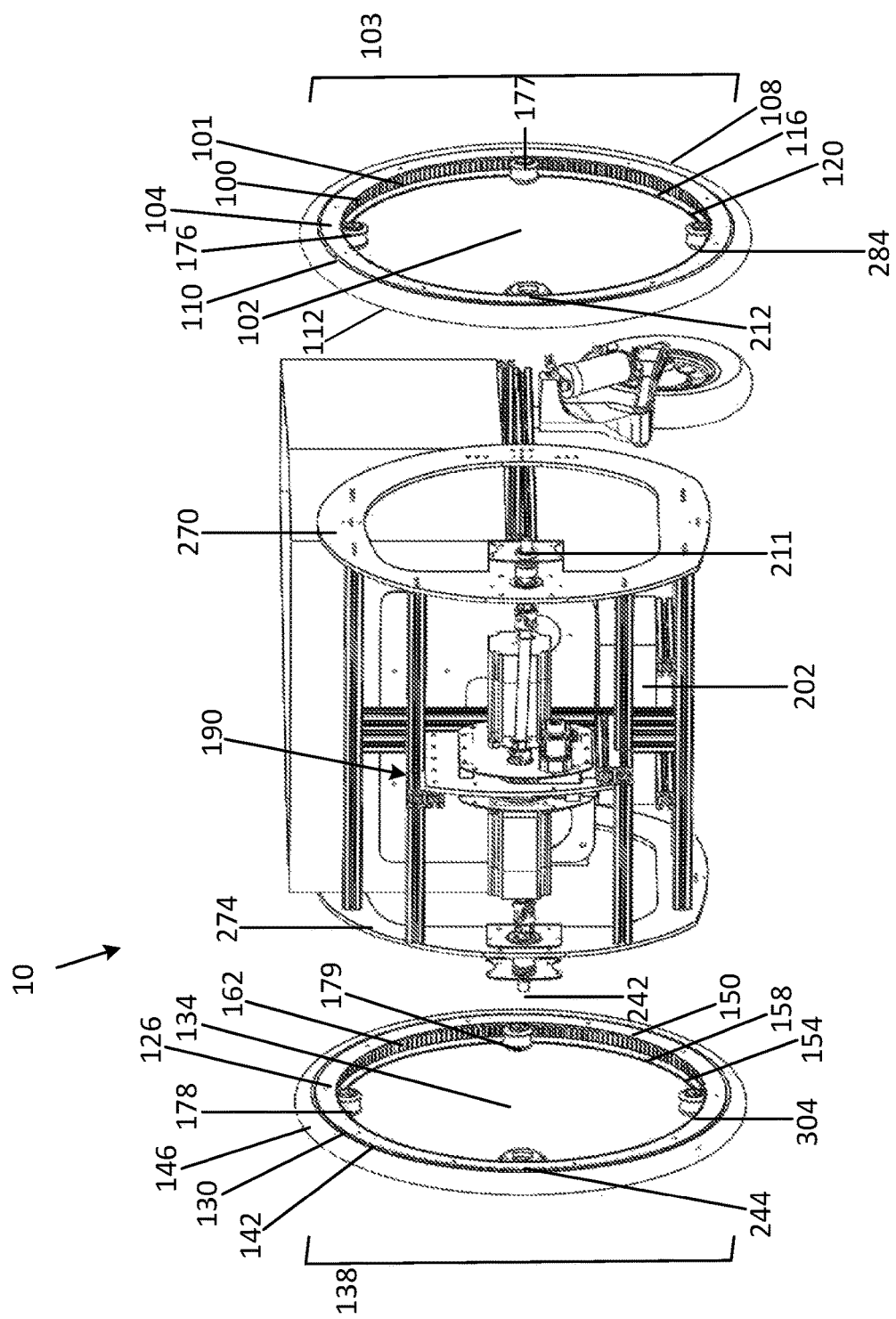
FIG. 4 is a perspective view of a vehicle according to exemplary implementations of the present disclosure, showing some elements exploded from the vehicle.

In some implementations, the present disclosure provides for the first wheel 100 and the second wheel 126, as shown in FIG. 4. The first wheel 100 is rotatably attached to the chassis 14. In some implementations, the first wheel 100 is rotatably attached to another part of the vehicle 10. The first wheel 100 includes a first perimeter 101, a first geometric center 102 and a first diameter 103. In some implementations, the diameter of the first wheel 100 is at least 80% of the height 15 and/or width 17 of the vehicle 10.

The first wheel 100 includes a first rim 104 substantially defining a first outer surface 110 of the first wheel 100. A first tire 108 is disposed around the first rim 104 and in some implementations is removably mounted to the first rim 104, such that the first tire 108 rotates along with the first rim 104. The first tire 108 is made from a rubber, polymer or any other suitable material. The first tire 108 serves to protect the first wheel 100 and vehicle 10, and further provides a frictional contact between the first wheel 100 and a ground surface to enhance the performance of the vehicle 10.

The first wheel 100 also includes a first inner surface 112 and the first inner surface 112 is disposed on an opposite side of the first wheel 100 from the first outer surface 110. The first inner surface 112 includes a first plurality of teeth 116. The first plurality of teeth 116 are connected to the first rim 104 such that a rotation of the first plurality of teeth 116 corresponds to a rotation of the first rim 104. In some implementations, the first plurality of teeth 116 are integrally formed with the first inner surface 112. In some implementations, the first plurality of teeth 116 are, permanently or removably, attached to the first inner surface 112. In some implementations, the first inner surface 112 and the first plurality of teeth 116 effectively form a first ring gear 120 on the first inner surface 112 of the first wheel 100. The first plurality of teeth 116 and the first inner surface 112 can be formed from a metal, metal alloy, ceramic, polymer, composite material or any other suitable material.

In some implementations, the first plurality of teeth 116 are disposed on a first toothed belt 124, as best shown in FIG. 1. The first toothed belt 124 is attached, permanently or removably, to the first inner surface 112 of the first wheel 100. The first plurality of teeth 116 on the first toothed belt 124 are connected to the first rim 104 such that a rotation of the first plurality of teeth 116 results in a rotation of the first rim 104. The first toothed belt 124 can be formed of a metal, metal alloy, ceramic, polymer, composite material or any other suitable material.

The vehicle 10 includes a second wheel 126 having a second perimeter 130, a second geometric center 134, a second diameter 138, a second rim 142, a second tire 146, a second outer surface 150, a second inner surface 154, a second plurality of teeth 158 and a second ring gear 162 or a second toothed belt 166, as best shown in FIGS. 3 and 4. In some implementations, the second diameter 138 is at least 80% of the height 15 and/or width 17 of the vehicle 10. Each of these 'second' elements connects, and operatively associates, with one another in the same manner as their above-described corresponding 'first' elements. For example, the second tire 146 and the second rim 142 connect, and operatively associate, with each other in the same manner as the first tire 108 and the first rim 104. In some implementations, the first wheel 100 and the second wheel 126 are between ten and forty inches in diameter.

Figure 5:
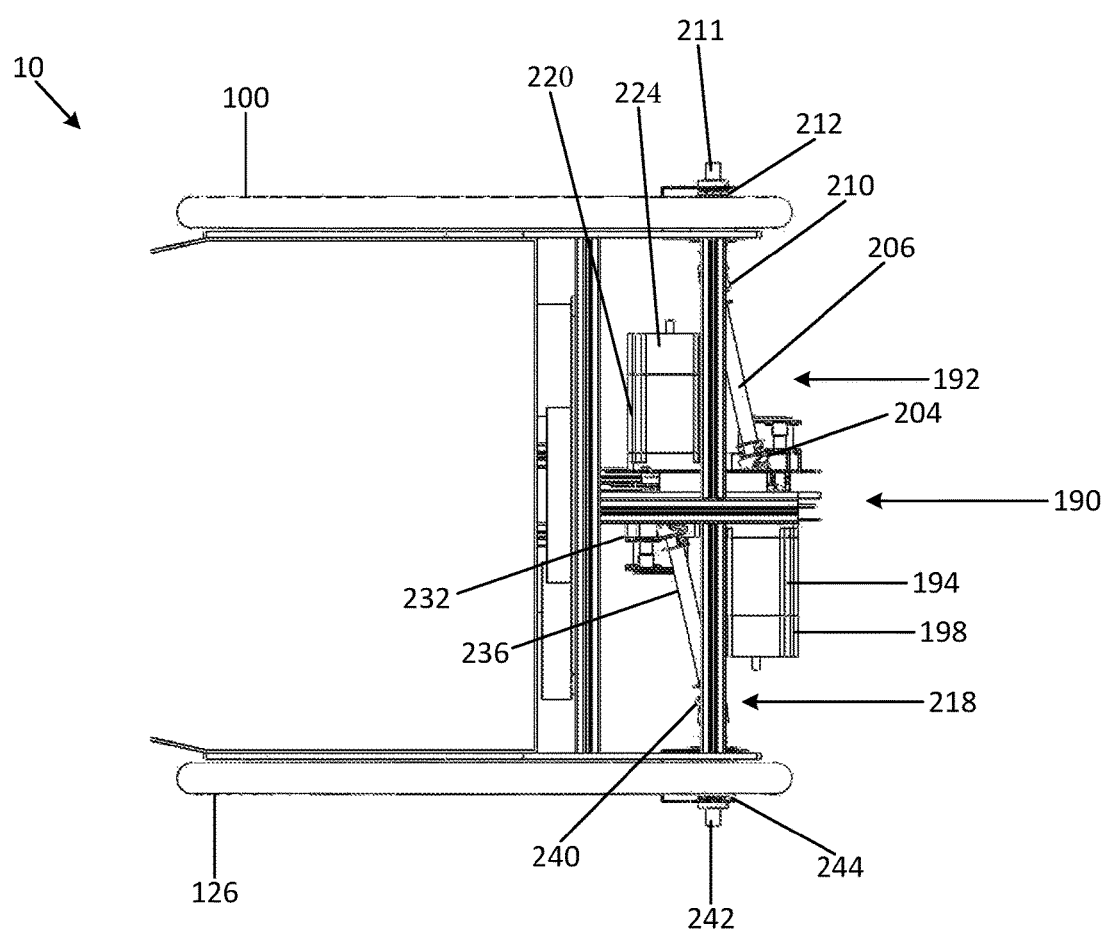
FIG. 5 is a top view of a drive system according to exemplary implementations of the present disclosure.

Aspects of the present disclosure additionally include a drive system 190 as best shown in FIGS. 4-8. Turning to FIG. 5, the drive system 190 is configured to generate a drive force and/or transmit a drive force to the first wheel 100 and the second wheel 126. The drive system 190 includes a first drivetrain 192 for operatively connecting a first motor 194 with the first wheel 100. The first motor 194 is an electric motor in some implementations. In some implementations, an internal combustion engine is also possible. The first motor 194 receives electrical energy from a battery 202 (shown in FIGS. 4 and 6) or fuel cell, or fuel from a fuel source or fuel tank (not shown). A first motor controller 198 provides commands to the first motor 194, and the first motor controller 198 may be disposed within the first motor 194 or at another location on the vehicle 10. The first motor 194 rotates a first drive gear 212 via elements of the first drivetrain 192 disposed between the first motor 194 and the first drive gear 212. The first drive gear 212 includes a plurality of first drive gear teeth that rotate along with, and are rigidly attached to, the first drive gear 212. The first drive gear 212, in some implementations, includes teeth formed in non-linear, or angled, shapes, and the first plurality of teeth 116 include mechanically engaging, or the same, shapes. The first drive gear 212, in some implementations, includes teeth formed in chevron shapes, and/or linear shapes, and the plurality of teeth 116 include mechanically engaging, or the same, shapes.

The first drivetrain 192 includes one or more rotatably-coupled elements and a rotation of one of these elements corresponds to a rotation of the remaining elements. As shown in FIG. 5, the first drivetrain 192 includes a first central universal joint 204, a first driveshaft 206, a first distal universal joint 210 and a first axle 211. These elements are best shown in FIG. 5.

The first drive gear 212 engages with, and drives, the first plurality of teeth 116 of the first wheel 100. In operation, the first motor 194 rotates the first central universal joint 204, which in turn rotates the first driveshaft 206, the first distal universal joint 210, the first axle 211 and the first drive gear 212, which rotates the first wheel 100 through the engagement of the first plurality of teeth 116 and the plurality of first drive gear teeth. In some implementations, the first plurality of teeth 116 mechanically engage with the first drive gear 212 at about the first perimeter 101 of the first wheel 100.

As shown in FIG. 5, a second drivetrain 218 provides a drive force to the second wheel 126. The vehicle 10 includes a second motor 220, a second motor controller 224, a second central universal joint 232, a second driveshaft 236, a second distal universal joint 240, a second axle 242 and a second drive gear 244 having a plurality of second drive gear teeth. Each of these 'second' elements connects, and operatively associates, with one another in the same manner as their above-described corresponding 'first' elements. For example, the second driveshaft 236 and the second central universal joint 232 are rotatably connected, and operatively associated, with each other in the same manner as the first driveshaft 206 and the first central universal joint 204. In some implementations, the second plurality of teeth 158 mechanically engage with the second drive gear 244 at about the second perimeter 130 of the second wheel 126.

FIG. 4 also shows a first inner attachment plate 270 that facilitates a rotatable connection between the first wheel 100 and the chassis 14. The first inner attachment plate 270 rotatably mounts a first idler gear 176 and a second idler gear 177, as well as the first axle 211 and the first drive gear 212. The first inner attachment plate 270 also rotatably mounts a first tensioner gear 284, which will be described below. Each of the first idler gear 176, second idler gear 177, first drive gear 212 and first tensioner gear 284 mechanically engages with the first plurality of teeth 116. Similarly, as also shown in FIG. 4, a second inner attachment plate 274 facilitates a rotatable connection between the second wheel 126 and the chassis 14. The second inner attachment plate 274 rotatably mounts a third idler gear 178 and a fourth idler gear 179, as well as the second axle 242 and the second drive gear 244. The second inner attachment plate 274 also rotatably mounts a second tensioner gear 304, which will be described below. Each of the third idler gear 178, fourth idler gear 179, second drive gear 244 and second tensioner gear 304 mechanically engages with the second plurality of teeth 158.

The vehicle 10 can be propelled in multiple directions, and can change direction by selective operation of the first motor 194 and the second motor 220. In some implementations, the mount motor 75 may also facilitate a change in direction of the vehicle 10 by rotating the third wheel mount 84 relative to the chassis 14 about the mount axis 88. The vehicle 10 may use various sensors, receivers and processors to autonomously navigate various paths, or may operate under remote control or pre-programmed operation instructions.

Figure 6:
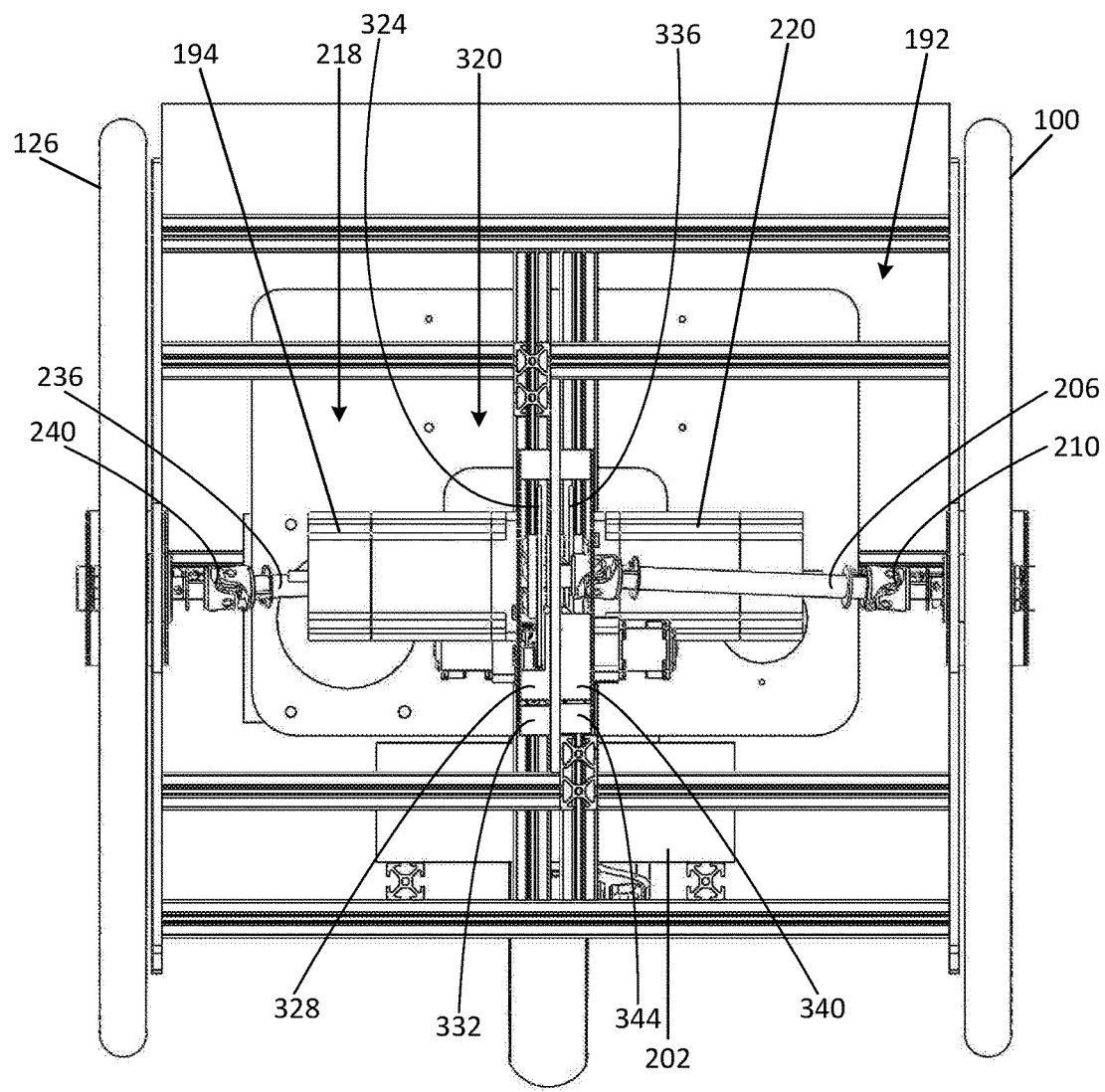
FIG. 6 is a front view of a vehicle and elements of a drive system according to exemplary implementations of the present disclosure.
Figure 7:
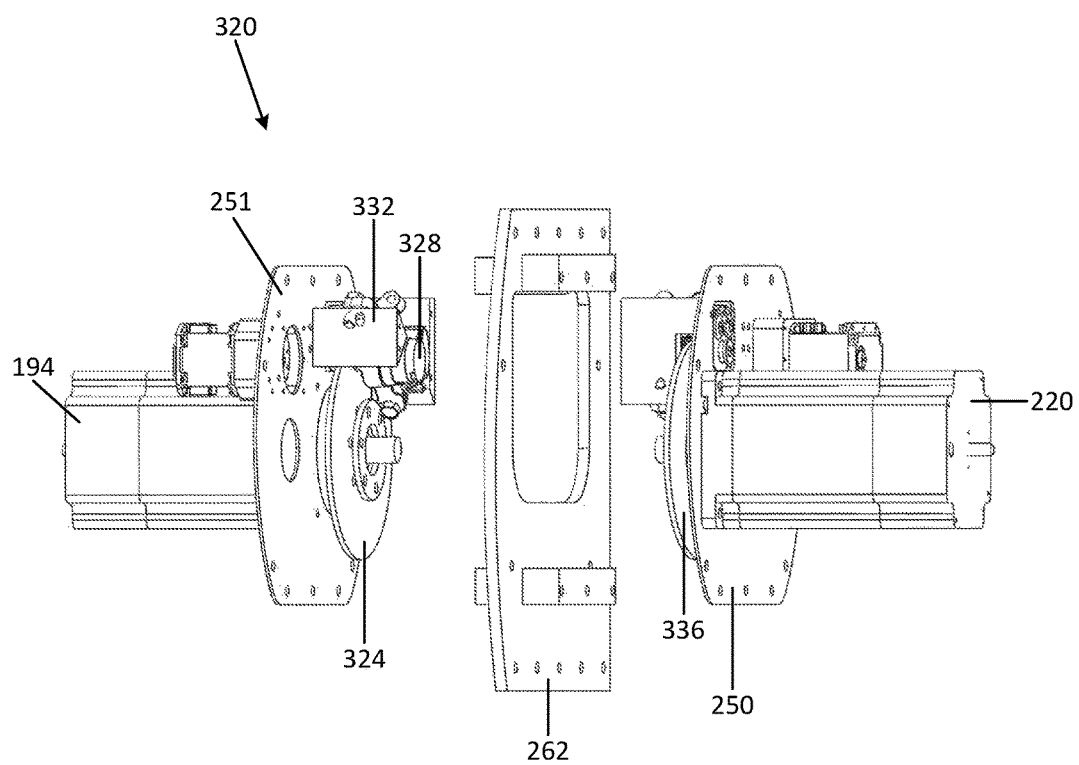
FIG. 7 is an exploded and perspective view of elements of a drive system for a vehicle according to exemplary implementations of the present disclosure.
Figure 8:
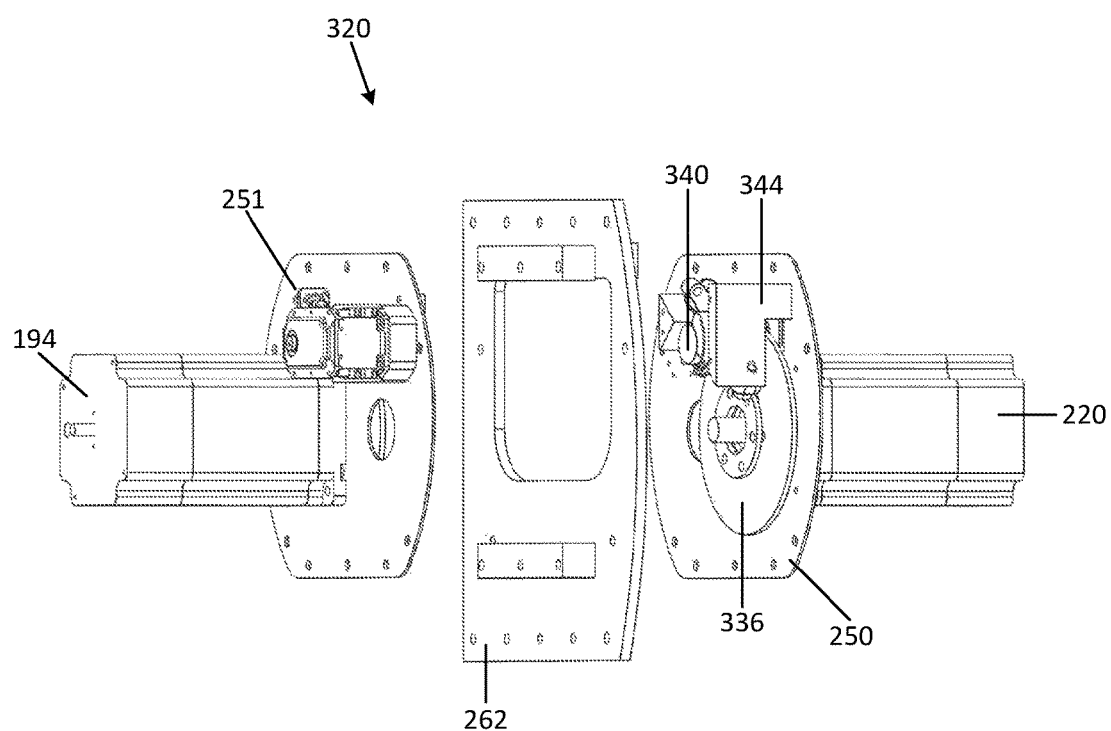
FIG. 8 is another exploded and perspective view of elements of a drive system for a vehicle according to exemplary implementations of the present disclosure.

A braking system 320 is shown in FIGS. 6-8. Turning to FIG. 6, a first brake disc 324 is mounted on the first drivetrain 192. The first brake disc 324 is rotatably connected to the first drivetrain 192 such that a rotational movement of the first brake disc 324 corresponds to a rotational movement of the first drivetrain 192, and vice versa. The first brake disc 324 may be disposed on, or around, any element of the first drivetrain 192, such as the first driveshaft 206, first axle 211 or any other shaft, joint, rotating element or component of the first drivetrain 192. A first caliper 328 selectively applies at least one frictional element to one or more sides of the first brake disc 324, such that the frictional element contacts the first brake disc 324 and frictionally causes a reduction in rotational velocity of the first brake disc 324 by converting rotational kinetic energy to thermal energy. A first caliper actuator 332 may selectively provide a braking energy to the first caliper 328, such that brake energy is provided from the first caliper actuator 332 to the first caliper 328 to frictionally reduce a rotational velocity of the first brake disc 324. Brake energy may be conveyed from the first caliper actuator 332 to the first caliper 328 by hydraulic or pneumatic pressure, a mechanical cable or any other suitable mechanical or electrical means.

As also shown in FIGS. 6-8, a second brake disc 336 is disposed on the second drivetrain 218. The vehicle 10 includes a second caliper 340 and a second caliper actuator 344. Each of these 'second' elements connects, and operatively associates, with one another in the same manner as their above-described corresponding 'first' elements. For example, the second brake disc 336 and the second drivetrain 218 are rotatably connected, and operatively associated, with each other in the same manner as the first brake disc 324 and the first drivetrain 192. Elements of the braking system 320 are shown in perspective in FIGS. 7 and 8.

In some implementations, the first motor 194 selectively performs regenerative braking of the vehicle 10 and/or the first wheel 100 by converting kinetic energy from a motion of the vehicle 10 and/or from a rotation of the first wheel 100 into electrical energy via the first motor 194. In this manner, kinetic energy from a motion of the vehicle 10 and/or from a rotation of the first wheel 100 is converted into electrical energy that can be stored in the battery 202, and a rotational speed of the first wheel 100 and/or a speed of the vehicle 10 are reduced. Similarly, in some implementations, the second motor 220 selectively performs regenerative braking of the vehicle 10 and/or the second wheel 126 by converting kinetic energy from a motion of the vehicle 10 and/or from a rotation of the second wheel 126 into electrical energy via the second motor 220. In this manner, kinetic energy from a motion of the vehicle 10 and/or from a rotation of the second wheel 126 is converted into electrical energy that can be stored in the battery 202, and a rotational speed of the second wheel 126 and/or a speed of the vehicle 10 are reduced. In certain modes, the vehicle 10 may employ regenerative braking from one or both of the first motor 194 and second motor 220, mechanical braking from the braking system 320, or regenerative braking from one or both of the first motor 194 and second motor 220 along with mechanical braking from the braking system 320.

Continuing with FIGS. 7 and 8, a first drivetrain support structure 250, a second drivetrain support structure 251 and a central support structure 262 structurally support elements of the first drivetrain 192, second drivetrain 218 and braking system 320. The first drivetrain support structure 250, second drivetrain support structure 251 and central support structure 262 are, in some implementations, rigidly connected together and form a structural portion of the chassis 14.

Figure 9:
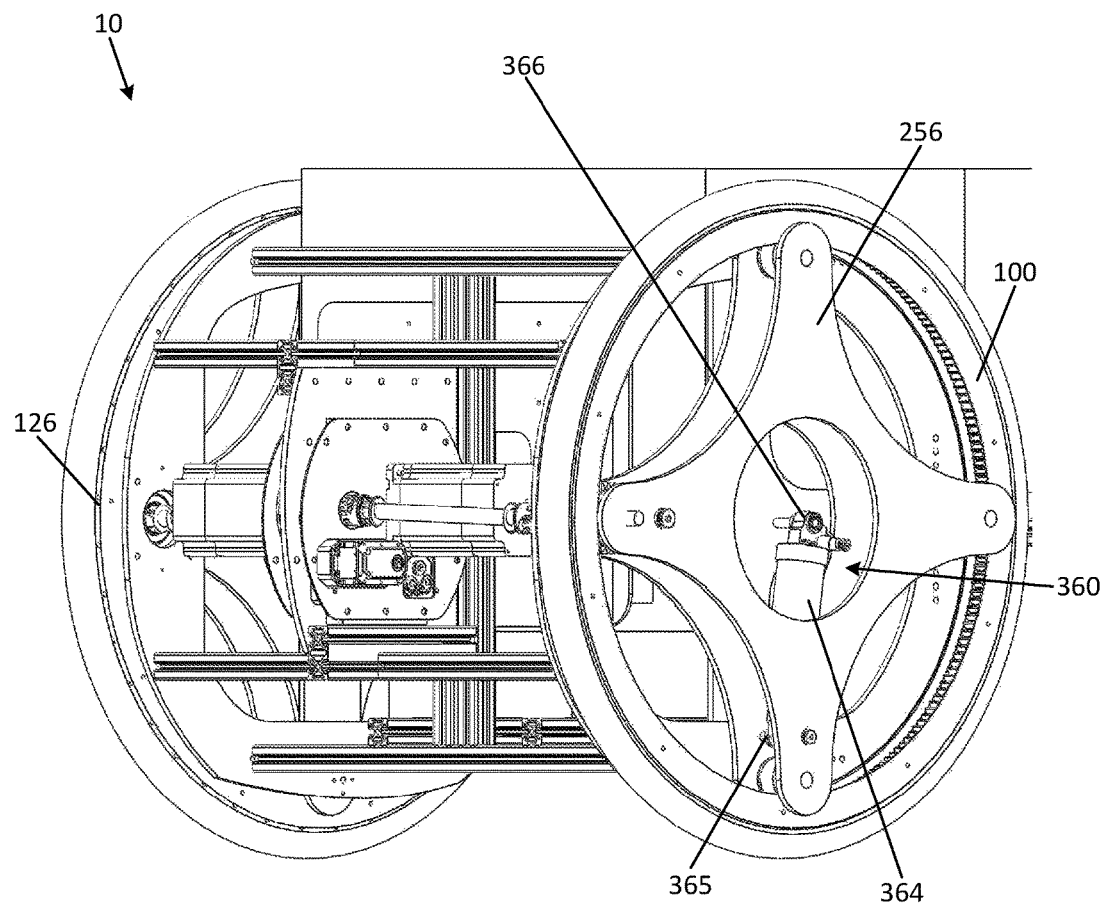
FIG. 9 is a perspective view of a vehicle and elements of a drive system for a vehicle according to exemplary implementations of the present disclosure.

Turning to FIG. 9, a first suspension system 360 is shown. The first suspension system 360 includes a first suspension element 364 providing damping and/or suspension properties for the first wheel 100 relative to the chassis 14. The first suspension element 364 includes, in some implementations, springs, pneumatic or hydraulic chambers or electro-magnetic dampers. A first end 365 of the first suspension element 364 is, in some implementations, connected to a first outer attachment structure 256, while a second end 366 of the first suspension element 364 is connected to the chassis 14 directly or indirectly. The first outer attachment structure 256 connects to one or more of the first idler gear 176, second idler gear 177, first drive gear 212, first tensioner gear 284 and the first end 365 of the first suspension element 364.

Figure 10:
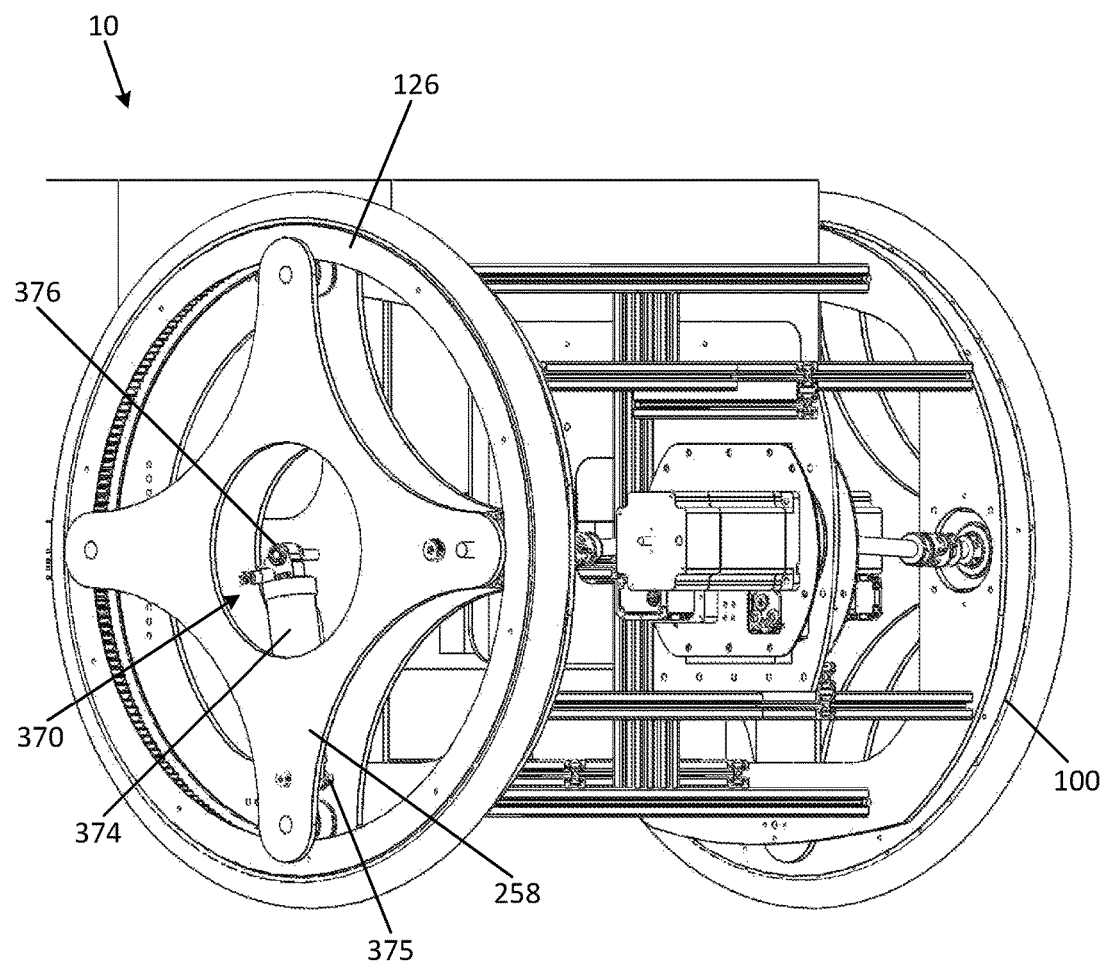
FIG. 10 is another perspective view of a vehicle and elements of a drive system for a vehicle according to exemplary implementations of the present disclosure.

FIG. 10 shows a second suspension system 370 including a second suspension element 374 providing damping and/or suspension properties for the second wheel 126 relative to the chassis 14. The second suspension element 374 includes, in some implementations, springs, pneumatic or hydraulic chambers or electro-magnetic dampers. A first end 375 of the second suspension element 374 is, in some implementations, connected to a second outer attachment structure 258, while a second end 376 of the second suspension element 374 is connected to the chassis 14 directly or indirectly. The second outer attachment structure 258 connects to one or more of the third idler gear 178, fourth idler gear 179, second drive gear 244, second tensioner gear 304 and the first end 375 of the second suspension element 374.

Figure 11:
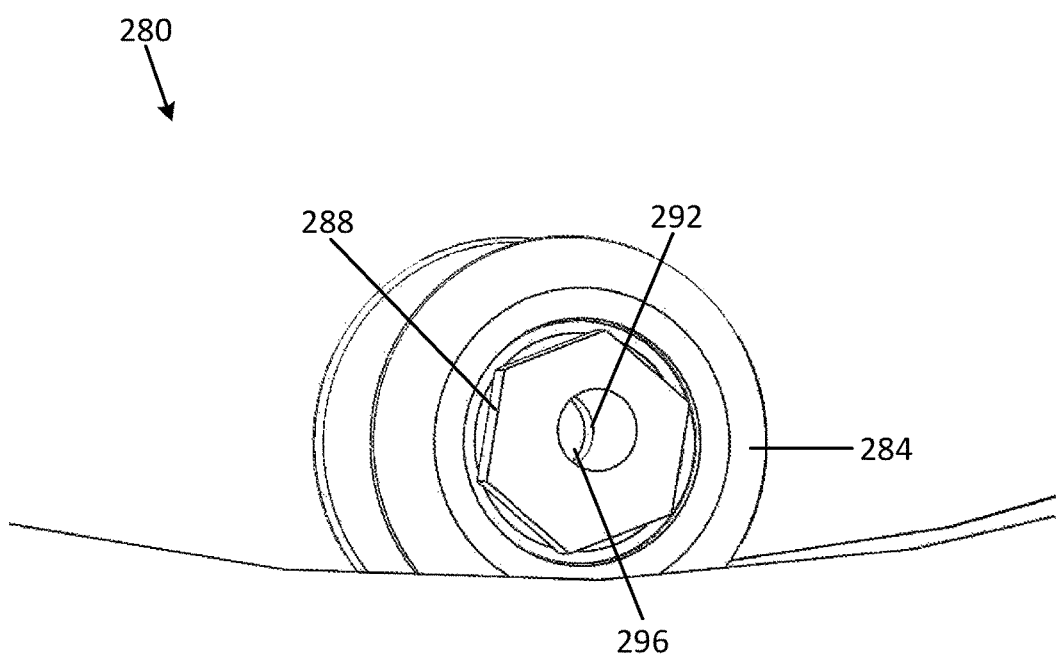
FIG. 11 is a perspective view of a tensioning system for a vehicle according to exemplary implementations of the present disclosure.

FIG. 11 shows a first tensioning system 280 including a first tensioner gear 284 and a first tensioner gear mount 288. The first tensioner gear mount 288 is, in some implementations, rotationally mounted to the chassis 14, the first outer attachment structure 256 and/or the first inner attachment plate 270. A rotation point 292 of the first tensioner gear mount 288 indicates a point along an axis of relative rotation between the first tensioner gear mount 288 and chassis 14, the first outer attachment structure 256 and/or the first inner attachment plate 270 to which the first tensioner gear mount 288 is rotationally mounted. A rotation point 296 of the first tensioner gear mount 288 relative to the first tensioner gear 284 indicates a point along an axis of relative rotation between the first tensioner gear mount 288 and the first tensioner gear 284. As rotation points 292 and 296 are distinct, a rotation of the first tensioner gear mount 288 relative to one or more of the chassis 14, first outer attachment structure 256 and/or the first inner attachment plate 270 to which the first tensioner gear mount 288 is rotationally mounted results in a change in tensioning of the first wheel 100 as a distance between the rotation point 296 and a point on the first inner surface 112 is changed. Further, in some implementations, rotation point 296 corresponds to a geometric center of the first tensioner gear 284.

Figure 12:
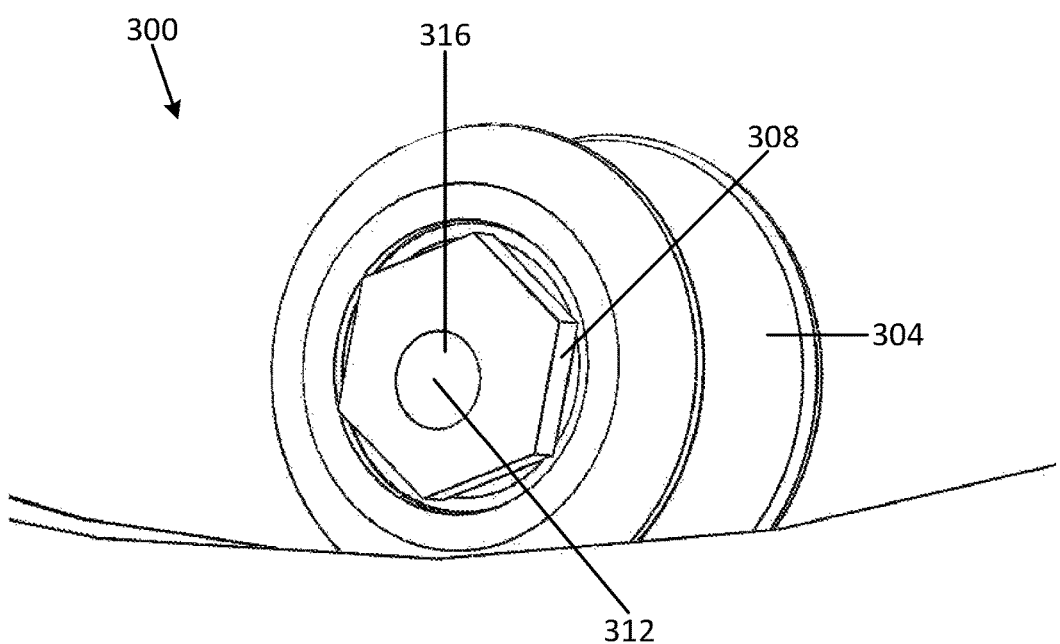
FIG. 12 is another perspective view of a tensioning system for a vehicle according to exemplary implementations of the present disclosure.

FIG. 12 shows a second tensioning system 300 including a second tensioner gear 304 and a second tensioner gear mount 308. A rotation point 312 of the second tensioner gear mount 308 indicates a point along an axis of relative rotation between the second tensioner gear mount 308 and chassis 14, the second outer attachment structure 258 and/or the second inner attachment plate 274 to which the second tensioner gear mount 308 is rotationally mounted. A rotation point 316 of the second tensioner gear mount 308 relative to the second tensioner gear 304 indicates a point along an axis of relative rotation between the second tensioner gear mount 308 and the second tensioner gear 304. Each of these 'second' elements connects, and operatively associates, with one another in the same manner as their above-described corresponding 'first' elements. As rotation points 316 and 312 are distinct, a rotation of the second tensioner gear mount 308 relative to one or more of the chassis 14, second outer attachment structure 258 and/or the second inner attachment plate 274 to which the second tensioner gear mount 308 is rotationally mounted results in a change in tensioning of the second wheel 126 as a distance between the rotation point 316 and a point on the second inner surface 154 is changed. Further, in some implementations, rotation point 316 corresponds to a geometric center of the second tensioner gear 304.

In some implementations, the first tensioner gear mount 288 rotatably mounts the first tensioner gear 284 at a location discrete from a geometric center of the first tensioner gear mount 288, such that a rotation of the first tensioner gear mount 288 adjusts the tension of the first wheel 100 relative to the first idler gear 176 and the first drive gear 212. In some implementations, the second tensioner gear mount 308 rotatably mounts the second tensioner gear 304 at a location discrete from a geometric center of the second tensioner gear mount 308, such that a rotation of the second tensioner gear mount 308 adjusts the tension of the second wheel 126 relative to the third idler gear 178 and the second drive gear 244.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A three-wheeled vehicle, comprising:
   a chassis having a first end and a second end;
   a first wheel connected to a first side of the chassis at the first end by a first inner attachment plate that facilitates a rotatable connection between the first wheel and the chassis, the first wheel having a first perimeter, a first diameter and a first geometric center;
   a second wheel connected to a second side of the chassis at the first end by a second inner attachment plate that facilitates a rotatable connection between the second wheel and the chassis, the second wheel having a second perimeter, a second diameter and a second geometric center;
   a first drive gear rotatably mounted to the first inner attachment plate and operatively coupled to a first motor;
   a second drive gear rotatably mounted to the second inner attachment plate and operatively coupled to a second motor;
   a first plurality of teeth disposed about the first wheel and mechanically engaged with the first drive gear at a location closer to the first perimeter than to the first geometric center;
   a first tensioner gear and a first idler gear coupled to the first inner attachment plate, wherein the first tensioner gear and first idler gear are mechanically engaged with the first plurality of teeth;
   a second plurality of teeth disposed about the second wheel and mechanically engaged with the second drive gear at a location closer to the second perimeter than to the second geometric center;
   a mount rotatably connected to the chassis at the second end; and
   a third wheel rotatably connected to the mount.

2. The three-wheeled vehicle of claim 1, wherein a first tensioner gear mount rotatably mounts the first tensioner gear such that a rotation of the first tensioner gear mount adjusts the tension of the first wheel relative to the first idler gear and the first drive gear.

3. The three-wheeled vehicle of claim 1, wherein the mount rotates 360 degrees relative to the chassis, and wherein the mount rotates relative to the chassis about a mount axis that is substantially normal to a wheel axis.

4. The three-wheeled vehicle of claim 1, furthering including a first disc brake rotationally associated with the first wheel such that a rotational speed of the first wheel decreases with a decrease in a rotational speed of the first disc brake, and a second disc brake rotationally associated with the second wheel such that a rotational speed of the second wheel decreases with a decrease in a rotational speed of the second disc brake.

5. The three-wheeled vehicle of claim 4, wherein a first driveshaft is disposed between, and rotationally connects, the first disc brake and the first wheel, and a second driveshaft is disposed between, and rotationally connects, the second disc brake and the second wheel.

6. The three-wheeled vehicle of claim 4, wherein a first braking actuator provides energy to frictionally decrease a rotational speed of the first brake disc, and a second braking actuator provides energy to frictionally decrease a rotational speed of the second brake disc.

7. The three-wheeled vehicle of claim 1, wherein the first motor and the second motor perform regenerative braking of the three-wheeled vehicle, whereby kinetic energy of the three-wheeled vehicle is converted into electrical energy via the first motor and the second motor.

8. The three-wheeled vehicle of claim 1, wherein an electric steering motor at least partially controls a rotation of the mount relative to the chassis.

9. The three-wheeled vehicle of claim 1, wherein the first diameter and the second diameter are each at least 80% of an overall vehicle height.

10. The three-wheeled vehicle of claim 1, wherein the first plurality of teeth mechanically engages with the first drive gear at about the first perimeter of the first wheel, and the second plurality of teeth mechanically engages with the second drive gear at about the second perimeter of the second wheel.

11. The three-wheeled vehicle of claim 10, further comprising a first ring gear including the first plurality of teeth coupled to an inner surface of the first wheel, and a second ring gear including the second plurality of teeth coupled to an inner surface of the second wheel.

12. The two-wheeled vehicle of claim 10, wherein the first plurality of teeth is disposed on a first drive belt affixed to an inner surface of the first wheel, and the second plurality of teeth is disposed on a second drive belt affixed to an inner surface of the second wheel.

13. The three-wheeled vehicle of claim 1, further comprising a cargo volume at least partially disposed between the first wheel and the second wheel and supported by the chassis.

14. The three-wheeled vehicle of claim 1, wherein the third wheel is operatively associated with the chassis via a mount suspension system.

15. A three-wheeled vehicle, comprising:
a chassis having a first end and a second end;
a first wheel rotatably connected to the chassis at the first end, the first wheel having a first perimeter, a first diameter and a first geometric center, and a first plurality of teeth disposed about an interior of the first perimeter;
a second wheel rotatably connected to the chassis at the first end, the second wheel having a second perimeter, a second diameter and a second geometric center, and a second plurality of teeth disposed about an interior of the second perimeter;
a first motor configured to provide a first drive energy via a first drive gear to rotate the first wheel;
a second motor configured to provide a second drive energy to via a second drive gear to rotate the second wheel;
a cargo volume at least partially disposed between the first wheel and the second wheel and supported by the chassis; and
a third wheel rotatably connected to a mount at the second end.

16. The three-wheeled vehicle of claim 15, further comprising:
a first inner attachment plate that facilitates a rotatable connection between the first wheel and the chassis, wherein the first drive gear is coupled to the first inner attachment plate; and
at least one first tensioner gear and/or at least one first idler gear coupled to the first inner attachment plate to engage the first plurality of teeth disposed about the interior of the first perimeter.

17. The three-wheeled vehicle of claim 16, further comprising:
a second inner attachment plate that facilitates a rotatable connection between the second wheel and the chassis, wherein the second drive gear is coupled to the second inner attachment plate; and
at least one first tensioner gear and/or at least one second idler gear coupled to the second inner attachment plate to engage the second plurality of teeth disposed about the interior of the second perimeter.

18. The three-wheeled vehicle of claim 15, wherein the first wheel is connected to a first side of the chassis and the second wheel is connected to a second side of the chassis.

19. The three-wheeled vehicle of claim 15, wherein the first diameter and the second diameter are each at least 80% of an overall vehicle height.

20. A three-wheeled vehicle, comprising:
a chassis having a first end and a second end;
a first wheel connected to a first side of the chassis at the first end by a first inner attachment plate that facilitates a rotatable connection between the first wheel and the chassis, the first wheel having a first perimeter, a first diameter and a first geometric center;
a second wheel connected to a second side of the chassis at the first end by a second inner attachment plate that facilitates a rotatable connection between the second wheel and the chassis, the second wheel having a second perimeter, a second diameter and a second geometric center;
a first drive gear rotatably mounted to the first inner attachment plate and operatively coupled to a first motor;
a second drive gear rotatably mounted to the second inner attachment plate and operatively coupled to a second motor;
a first plurality of teeth disposed about the first wheel and mechanically engaged with the first drive gear at a location closer to the first perimeter than to the first geometric center;
a second plurality of teeth disposed about the second wheel and mechanically engaged with the second drive gear at a location closer to the second perimeter than to the second geometric center;
a mount rotatably connected to the chassis at the second end;
a third wheel rotatably connected to the mount; and
an electric steering motor that at least partially controls a rotation of the mount relative to the chassis.

21. A three-wheeled vehicle, comprising:
a chassis having a first end and a second end;
a first wheel connected to a first side of the chassis at the first end by a first inner attachment plate that facilitates a rotatable connection between the first wheel and the chassis, the first wheel having a first perimeter, a first diameter and a first geometric center;
a second wheel connected to a second side of the chassis at the first end by a second inner attachment plate that facilitates a rotatable connection between the second wheel and the chassis, the second wheel having a second perimeter, a second diameter and a second geometric center, wherein the first diameter and the second diameter are each at least 80% of an overall vehicle height;
a first drive gear rotatably mounted to the first inner attachment plate and operatively coupled to a first motor;
a second drive gear rotatably mounted to the second inner attachment plate and operatively coupled to a second motor;
a first plurality of teeth disposed about the first wheel and mechanically engaged with the first drive gear at a location closer to the first perimeter than to the first geometric center;
a second plurality of teeth disposed about the second wheel and mechanically engaged with the second drive gear at a location closer to the second perimeter than to the second geometric center;
a mount rotatably connected to the chassis at the second end; and
a third wheel rotatably connected to the mount.

22. A three-wheeled vehicle, comprising:
a chassis having a first end and a second end;
a first wheel connected to a first side of the chassis at the first end by a first inner attachment plate that facilitates a rotatable connection between the first wheel and the chassis, the first wheel having a first perimeter, a first diameter and a first geometric center;
a second wheel connected to a second side of the chassis at the first end by a second inner attachment plate that facilitates a rotatable connection between the second wheel and the chassis, the second wheel having a second perimeter, a second diameter and a second geometric center;
a first drive gear rotatably mounted to the first inner attachment plate and operatively coupled to a first motor;
a second drive gear rotatably mounted to the second inner attachment plate and operatively coupled to a second motor;

a first plurality of teeth disposed about the first wheel and mechanically engaged with the first drive gear at a location closer to the first perimeter than to the first geometric center;

a second plurality of teeth disposed about the second wheel and mechanically engaged with the second drive gear at a location closer to the second perimeter than to the second geometric center;

a mount rotatably connected to the chassis at the second end;

a third wheel rotatably connected to the mount; and a cargo volume at least partially disposed between the first wheel and the second wheel and supported by the chassis.

* * * * *